Patented Dec. 27, 1927.

1,653,821

UNITED STATES PATENT OFFICE.

STANLEY JOHN PEACHEY, OF LONDON, AND ALLON SKIPSEY, OF WOKING, ENGLAND.

PROCESS FOR THE VULCANIZATION OF CAOUTCHOUC.

No Drawing. Application filed March 19, 1925, Serial No. 16,816, and in Great Britain March 26, 1924.

This invention relates to the vulcanization of rubber by the use of certain agents which have not hitherto been employed for this purpose, and which in some respects, possess advantages over the agents at present in use.

According to the invention, the rubber either as such—that is to say in the solid form—or in the form of a solution in a suitable solvent, is treated with one of the sulphides of phosphorus, for example, the sesquisulphide ($P_4S_3$) or the pentasulphide ($P_2S_5$ or $P_4S_{10}$) or a mixture of such sulphides. A comparatively rapid reaction takes place, producing an effective vulcanization of the rubber.

The process is well adapted to the vulcanization of dipped rubber goods and of rubber proofed fabrics, and to the production of moulded rubber articles direct from rubber solution. In the first of these cases, the form, suitably coated with rubber by dipping in the usual manner, is immersed in a solution of one of the sulphides of phosphorus in a suitable solvent or mixture of solvents, such, for example, as carbon disulphide or a mixture of carbon disulphide and benzene. A few minute immersion suffices to produce effective vulcanization.

According to a further feature of the invention the vulcanized rubber may be subjected to after-treatment with ammonia, which results in improved physical properties.

*Example.*—A balloon form is coated by dipping in rubber solution to a thickness after drying, of 1 millimetre and is then immersed for three minutes in a saturated or nearly saturated solution of phosphorus sesquisulphide ($P_4S_3$) in carbon disulphide at the ordinary room temperature. The form is then removed from the solution, allowed to dry, and stripped in the usual manner.

It is to be noted that even a saturated solution of phosphorus sesquisulphide or pentasulphide at the ordinary room temperature is very weak and contains less than 3 grms of the material per 100 cc.'s of the solvent.

In the case of rubber proofed fabrics, the rubber coated surface of the fabric is exposed for a short time to the action of a solution of phosphorus sesquisulphide ($P_4S_3$) of phosphorus pentasulphide ($P_2S_5$ or $P_4S_{10}$) of a concentration similar to that employed for the vulcanization of dipped goods. The rubber thereby becomes vulcanized.

For the production of moulded rubber articles, a rubber solution of suitable concentration, for example, 10%, prepared with benzene, naphtha, carbon disulphide or other suitable solvent or mixture of solvents, is mixed with a certain proportion of one of the sulphides of phosphorus in the form of either a finely divided powder or a solution in a suitable solvent such as carbon disulphide. After thorough agitation, the mixture is poured into a mould of the desired shape and allowed to stand until gelling has occurred. The gel is then removed from the mould and the solvent evaporated either by the use of a moderate heat, or by exposure at the ordinary temperature.

The following figures will serve as an example of suitable proportions:—

500 cc.'s of a 10% solution of rubber in benzene or carbon disulphide are mixed with 150 cc.'s of a saturated solution of phosphorus sesquisulphide or phosphorus pentasulphide in carbon disulphide.

It is to be noted that if certain solvents such as chloroform be used in place of carbon disulphide as solvent for the phosphorus sulphide, gelling of the mixed solutions does not occur although on evaporation, a vulcanized rubber is obtained.

The sulphides of phosphorus may also be incorporated with rubber on a mixing mill of the type ordinarily in use in rubber manufacture, with or without the addition of pigments, fillers and the like. If the mixing rolls be allowed to get hot or if from any cause the rubber becomes heated while in contact with the sulphides of phosphorus, an immediate vulcanization sets in and the material cannot readily be sheeted. It is preferable, therefore, to employ cool rolls, and/or to add to the rubber a small proportion of a suitable rubber solvent such, for example, as naphtha.

Under these conditions vulcanization of the rubber does not occur to any appreciable extent, and the material may be sheeted, moulded or built up as desired, and subsequently vulcanized either by allowing to stand at the ordinary temperature for a suitable period of time, or more expeditiously by heating to a moderate temperature, for example, 100 degrees centigrade until vulcanization has occurred.

*Example I.*—1 kilogramme of plantation crepe is lightly masticated on the mixing rolls with the addition of 150 cc.'s of naphtha. 36 grms. of phosphorus pentasulphide ($P_2S_5$ or $P_4S_{10}$) are then incorporated and the mix is sheeted in the usual manner. It is then heated to a temperature of 100 degrees centigrade for 30 minutes when a good cure is obtained. Prolonged standing at the ordinary temperature will also bring about vulcanization.

*Example II.*—1 kilogramme of Pará rubber is masticated with the addition of 150 cc.'s of naphtha and 36 grms. of phosphorus sesquisulphide ($P_4S_3$) are added and incorporated thoroughly.

The mixing is then heated to a temperature of 135 degrees centigrade for a period of 30 minutes, when a good cure results. Prolonged standing at the ordinary temperature will also bring about vulcanization.

When it is desired to subject the rubber, after vulcanization, to after-treatment with ammonia, such after treatment may be either by exposing the vulcanized rubber to an atmosphere of or containing ammonia gas, or by subjecting the vulcanized rubber to the action of a solution of ammonia in water, benzene or other suitable solvent, the solvent being subsequently evaporated.

It is found in practice that rubber vulcanized by the use of sulphides of phosphorus, as in the methods described in the foregoing, acquires when subjected to an after-treatment with ammonia, increased strength and tenacity.

Solutions of rubber in any suitable solvent when treated with an insufficient quantity of the sulphides of phosphorus to produce gelling under normal conditions, are caused to gel immediately by the addition of a solution of ammonia in benzene or other suitable solvent.

It will be understood that the invention is not confined to the quantities of materials, times of heating, or concentration of solutions specified in the examples herein quoted, as these may be varied over a wide range. Further, the applications of the process herein described are merely illustrations of its use and it is to be understood that without departing from the invention the process may be applied in other ways to the vulcanization of either solid, dissolved or emulsified rubber.

What we claim is:—

1. The process of vulcanizing rubber consisting in the treatment of same with at least one of the sulphides of phosphorus.

2. Rubber vulcanized according to the process claimed in claim 1.

3. The process of vulcanizing rubber consisting in first treating the rubber with at least one of the sulphides of phosphorus, and then subjecting the rubber to an after-treatment with ammonia.

4. Rubber vulcanized according to the process claimed in claim 3.

In testimony whereof we have signed our names to this specification.

STANLEY JOHN PEACHEY.
ALLON SKIPSEY.